(12) United States Patent
Zhang et al.

(10) Patent No.: US 10,489,624 B2
(45) Date of Patent: Nov. 26, 2019

(54) CONTROL METHOD, CONTROL DEVICE AND ELECTRONIC DEVICE

(71) Applicant: Guangdong Oppo Mobile Telecommunications Corp., Ltd., Dongguan (CN)

(72) Inventors: Haiping Zhang, Dongguan (CN); Yibao Zhou, Dongguan (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 269 days.

(21) Appl. No.: 15/552,972

(22) PCT Filed: Aug. 5, 2016

(86) PCT No.: PCT/CN2016/093634
§ 371 (c)(1),
(2) Date: Aug. 23, 2017

(87) PCT Pub. No.: WO2017/096930
PCT Pub. Date: Jun. 15, 2017

(65) Prior Publication Data
US 2018/0075276 A1    Mar. 15, 2018

(30) Foreign Application Priority Data
Dec. 8, 2015  (CN) .......................... 2015 1 0901723

(51) Int. Cl.
*G06K 9/00* (2006.01)
*H04L 9/32* (2006.01)
(Continued)

(52) U.S. Cl.
CPC ..... *G06K 9/00013* (2013.01); *G06K 9/00087* (2013.01); *G06K 9/2027* (2013.01);
(Continued)

(58) Field of Classification Search
None
See application file for complete search history.

(56) References Cited

U.S. PATENT DOCUMENTS 6,049,620 A * 4/2000 Dickinson .............. G01B 7/004
382/108
6,518,560 B1 * 2/2003 Yeh ....................... G06K 9/0002
250/214 AG
(Continued)

FOREIGN PATENT DOCUMENTS

CN          102279924      12/2011
CN          102340455      12/2011
(Continued)

OTHER PUBLICATIONS

English Translation of: International Search Report and the Written Opinion dated Nov. 8, 2016, From the State Intellectual Property Office of the People's Republic of China Re. Applicaiton No. PCT/CN2016/093634 (Year: 2016).*
(Continued)

*Primary Examiner* — Kim Y Vu
*Assistant Examiner* — Nathan J Bloom
(74) *Attorney, Agent, or Firm* — Young Basile Hanlon & MacFarlane, P.C.

(57) ABSTRACT

A control method of controlling an electronic device is provided. The control method includes sequencing the number of times of gains used by a fingerprint sensor of the electronic device when fingerprint unlocking of the electronic device is successful, and controlling the fingerprint sensor to directly use a gain with the maximum number of times to obtain a fingerprint image to conduct fingerprint unlocking.

18 Claims, 4 Drawing Sheets

(51) Int. Cl.
    G06K 9/20      (2006.01)
    H04L 29/06     (2006.01)
    G06K 9/66      (2006.01)
    G06F 21/32     (2013.01)
(52) U.S. Cl.
    CPC .............. G06K 9/66 (2013.01); H04L 9/3231 (2013.01); H04L 63/0861 (2013.01); *G06F 21/32* (2013.01)

(56) References Cited

U.S. PATENT DOCUMENTS

| | | | | |
|---|---|---|---|---|
| 6,744,910 B1* | 6/2004 | McClurg | ............ | G06K 9/00013 340/5.53 |
| 2006/0215887 A1* | 9/2006 | Nishimura | ............ | G06K 9/0012 382/124 |
| 2008/0212846 A1* | 9/2008 | Yamamoto | ......... | G06K 9/00087 382/115 |
| 2009/0274343 A1* | 11/2009 | Clarke | ............... | G06K 9/00026 382/115 |
| 2010/0083357 A1 | 4/2010 | Challener et al. | | |
| 2012/0016798 A1 | 1/2012 | Carper | | |
| 2013/0234825 A1* | 9/2013 | Malhotra | ............. | A61B 5/1172 340/5.53 |
| 2013/0279769 A1 | 10/2013 | Benkley, III et al. | | |
| 2014/0072185 A1* | 3/2014 | Dunlap | ............... | G06K 9/00288 382/118 |
| 2014/0286545 A1 | 9/2014 | Yi et al. | | |
| 2015/0023571 A1* | 1/2015 | Gozzini | ............. | G06K 9/00067 382/124 |
| 2016/0358003 A1* | 12/2016 | Shen | .................... | G06K 9/0002 |
| 2016/0364597 A1* | 12/2016 | Chen | .................... | G06K 9/0002 |
| 2017/0344734 A1* | 11/2017 | Zhou | ..................... | G06F 1/1692 |
| 2017/0344781 A1* | 11/2017 | Zhou | ........................ | G06F 21/32 |
| 2017/0344784 A1* | 11/2017 | Zhou | .......................... | G06F 3/01 |
| 2017/0344795 A1* | 11/2017 | Zhou | ........................ | G06F 21/32 |
| 2017/0344796 A1* | 11/2017 | Zhang | ............... | G06K 9/00026 |
| 2018/0082048 A1* | 3/2018 | Yang | ........................ | G06F 3/011 |
| 2019/0018945 A1* | 1/2019 | Zhou | ........................ | G07C 9/00 |

FOREIGN PATENT DOCUMENTS

| | | |
|---|---|---|
| CN | 103116846 | 5/2013 |
| CN | 103119630 | 5/2013 |
| CN | 103778420 | 5/2014 |
| CN | 103914694 | 7/2014 |
| CN | 104790190 | 7/2015 |
| CN | 105550647 | 5/2016 |
| WO | WO 2017/096930 | 6/2017 |

OTHER PUBLICATIONS

International Search Report and the Written Opinion dated Nov. 8, 2016 From the State Intellectual Property Office of the People's Republic of China Re. Application No. PCT/CN2016/093634 and its Translation of Search Report Into English. (9 Pages).

* cited by examiner

CONTROL METHOD, CONTROL DEVICE AND ELECTRONIC DEVICE

CROSS REFERENCE TO RELATED APPLICATION

This application is a National Phase of PCT Patent Application No. PCT/CN2016/093634 having International filing date of Aug. 5, 2016, which claims the benefit of priority of Chinese Patent Application No. 201510901723.3, filed on Dec. 8, 2015. The contents of the above applications are all incorporated by reference as if fully set forth herein in their entirety.

FIELD AND BACKGROUND OF THE INVENTION

The present disclosure relates to an electronic device, and more particularly, to a control method, a control device, and an electronic device.

For a dry human finger, a higher gain is required for a fingerprint unlocking device of related art to obtain a fingerprint image with a high signal-to-noise (S/N) ratio. For a sweaty human finger, a lower gain is required for a finger unlocking device of related art to obtain a fingerprint image with the high S/N ratio. Taken human fingers with different dry to wet levels into consideration, the fingerprint unlocking device needs to adopt different gains to obtain diverse fingerprint images and then to get fingerprint images with a high S/N ratio. However, it takes a lot of time for the fingerprint unlocking device to finish the job, which worsens the user experience.

SUMMARY OF THE INVENTION

An object of the present disclosure is to propose a control method, a control device, and an electronic device to solve the problems occurring in related art.

In an embodiment of a first aspect, there is provided a control method of controlling an electronic device is provided. The control method includes the following blocks.

The number of times of gains used by a fingerprint sensor of the electronic device are sequenced when fingerprint unlocking of the electronic device is successful.

The fingerprint sensor is controlled to directly use a gain with the maximum number of times to obtain a fingerprint image to conduct fingerprint unlocking.

According to the control method proposed by the present disclosure, the electronic device can be quickly unlocked by using the fingerprint image which is obtained by directly using the gain with the maximum number of times, based on the number of times of gains of the fingerprint images used for unlocking. It is not only user-friendly but also makes fingerprint unlocking personalized.

In an embodiment of a second aspect, there is provided a control device of controlling an electronic device is provided. The control device includes a processing module and an unlocking module.

The processing module is connected to a fingerprint sensor of the electronic device and is configured to sequence the number of times of gains used by a fingerprint sensor of the electronic device when fingerprint unlocking of the electronic device is successful.

The unlocking module is connected to the processing module and is configured to control the fingerprint sensor to directly use a gain with the maximum number of times to obtain a fingerprint image to conduct fingerprint unlocking.

With the control device proposed by the present disclosure, the electronic device can be quickly unlocked by using the fingerprint image which is obtained by directly using the gain with the maximum number of times, based on the number of times of gains of the fingerprint images used for unlocking. It is not only user-friendly but also makes fingerprint unlocking personalized.

In an embodiment of a third aspect, there is provided an electronic device includes the control device as provided above.

Additional advantages of the present disclosure are clearly shown either from the detailed description or from realization of the present disclosure.

DESCRIPTION OF SPECIFIC EMBODIMENTS OF THE INVENTION

Figure 1:
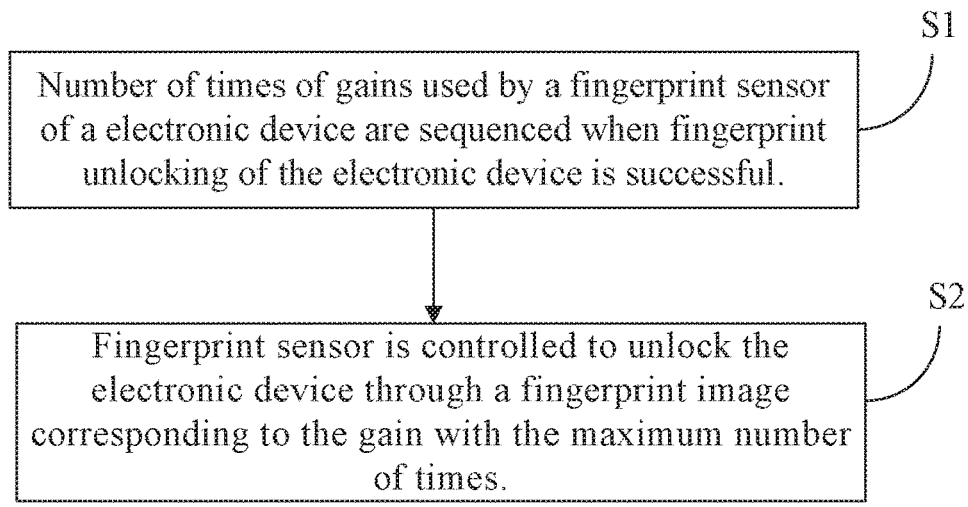
FIG. 1 illustrates a schematic flowchart of a control method according to an embodiment of the present disclosure.

Embodiments of the present application are illustrated in detail in the accompanying drawings, in which like or similar reference numerals refer to like or similar elements or elements having the same or similar functions throughout the specification. The embodiments described below with reference to the accompanying drawings are exemplary and are intended to be illustrative of the present application, and are not to be construed as limiting the scope of the present application.

Please refer to FIG. 1, a control method of controlling an electronic device according to an embodiment of the present disclosure can begin at block S1.

At block S1, the number of times of gains used by a fingerprint sensor of the electronic device are sequenced when fingerprint unlocking of the electronic device is successful.

When the electronic device with the function of fingerprint unlocking is unlocked, a fingerprint image for unlocking the electronic device is arranged in advance. During arranging the fingerprint image, the fingerprint sensor collects user's fingerprint for multiple times to obtain more comprehensive fingerprint information to improve accuracy of fingerprint unlocking and to store the obtained fingerprint information in a storage module of the electronic device. When conducting fingerprint unlocking on the electronic device, the fingerprint sensor collects the fingerprint image of the user and compares the collected fingerprint with the feature points of the fingerprint information of a predetermined fingerprint image. If the collected fingerprint matches the feature points of the fingerprint information, fingerprint unlocking of the electronic device can be completed.

When a user's finger touches (presses or slides) the fingerprint sensor, the fingerprint sensor divides the gains into several levels, such as levels 1 to 10, according to the humidity property or humidity of the user's finger. A dry finger is a special case of humidity. When obtaining a fingerprint image, the fingerprint sensor collects fingerprint images corresponding to all of the gains. Further, the clearest fingerprint image is chosen from all fingerprint images, that is, a fingerprint image with the most obvious feature points of the fingerprint information is chosen. The clearest fingerprint image is used to match the predetermined fingerprint image.

The electronic device records the gains of the fingerprint images that are adopted by the fingerprint sensor to compare with the predetermined fingerprint image each time fingerprint unlocking succeeds. Besides, the gains are sequenced by the electronic device. For example, the gains are divided into 10 levels, from level 1 to level 10. On 100 times of successful fingerprint unlocking, Gain levels 1-3 are adopted zero time; Gain level 4 is adopted 20 times; Gain level 5 is adopted 45 times; Gain level 6 is adopted 25 times; Gain level 7 is adopted 10 times; Gain levels 8-10 are adopted zero time. The number of times of the adopted gains in descending order is Gain level 5, Gain level 6, Gain level 4, Gain level 7, Gain levels 1-3 and Gain levels 8-10.

By counting the gains of the fingerprint images, one can learn user's habits or finger's characteristics so that the electronic device can be associated with the user more closely.

At block S2, the fingerprint sensor is controlled to unlock the electronic device through a fingerprint image corresponding to the gain with the maximum number of times.

Upon the 101th fingerprint unlocking, the fingerprint sensor adopts the gain with the maximum number of times directly (gain level 5) to obtain the fingerprint image.

Based on block S1, it is not necessary to obtain a plurality of fingerprint images during fingerprint unlocking of the device. It saves a lot of time on fingerprint unlocking.

Absolutely, the number of times recorded is not limited to the specific number, i.e. 100, introduced in the present embodiment. It is understood that the recorded number includes the number of successful unlocking before this unlocking.

The number of adopted gains are re-sequenced after each successful unlocking. In other words, the sequence of the number of adopted gains is updated.

For example, upon the first time of fingerprint unlocking, a fingerprint image can be obtained according to a gain of a predetermined fingerprint image at the time of setting. Or upon the first time of unlocking the device, a plurality of fingerprint images corresponding to all gains can be obtained, and the gain corresponding to a fingerprint image used in a successful fingerprint unlocking is recorded. In the subsequent process of fingerprint unlocking, based on the current sequence for the finished fingerprint unlocking, the gain with the maximum number of times is selected to capture a fingerprint image. That is, the record increases with the number of fingerprint unlocking. Correspondingly, the sequence of the number of gains varies as the times of fingerprint unlocking.

In addition, different users are associated with different sequences of number of times of gains. In this way, a link between user's fingerprint property and the fingerprint unlocking becomes closer.

In addition, in some embodiments, generally, a user's finger or environment does not change greatly in a short time so user's fingerprint does not change, either. At this time, a fingerprint sensor can be controlled to obtain a fingerprint image based on a gain used for the last successful fingerprint unlocking to perform fingerprint unlocking. In this way, the device is unlocked with the fingerprint quickly; otherwise, the device is unlocked repeatedly by performing block S2.

According to the control method proposed by the present disclosure, fingerprint unlocking can be quickly done by using a fingerprint image which is obtained by directly using the gain with the maximum number of times, based on the number of gains of the fingerprint images used for unlocking. It is not only user-friendly but also makes fingerprint unlocking personalized.

Figure 2:
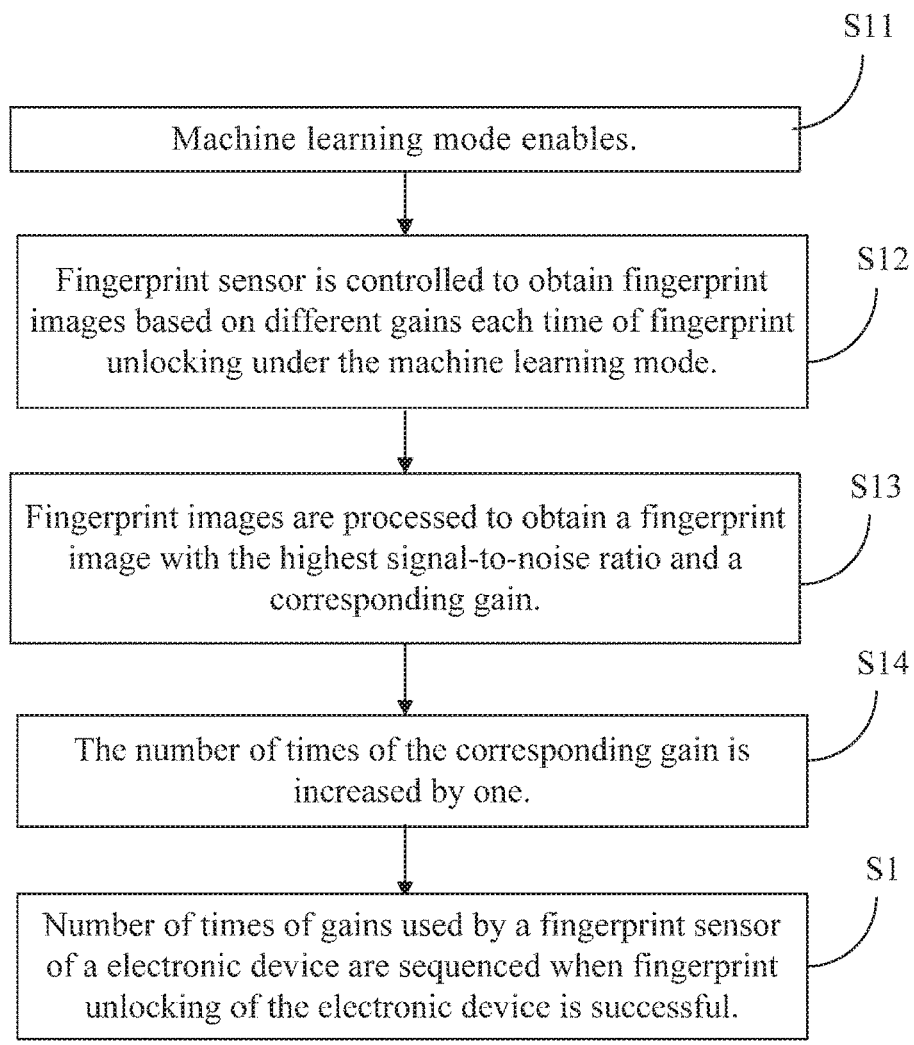
FIG. 2 illustrates a schematic flowchart of a control method according to another embodiment of the present disclosure.

As FIG. 2 illustrates, block S1 further includes block 11, block 12, block 13, and block 14 in some embodiments.

At block S11, the machine learning mode starts.

The electronic device enables the learning mode after the user operates on a menu. The user can unlock the device with his fingers for multiple times in the learning mode. It helps to provide the sequence of number of times of gains with a statistical base in normal use.

At block S12, the fingerprint sensor is controlled to obtain a plurality of fingerprint images based on different gains each time of fingerprint unlocking under the machine learning mode.

The fingerprint sensor obtains a plurality of fingerprint images corresponding to different gains each time fingerprint unlocking is done. Generally, the fingerprint sensor obtains fingerprint images corresponding to all gains. Or the fingerprint sensor obtains fingerprint images corresponding to gains with higher chances of successful fingerprint unlocking.

At block S13, the plurality of fingerprint images are processed to obtain a fingerprint image with the highest signal-to-noise ratio and a corresponding gain.

The plurality of obtained fingerprint images are processed such as the signal-to-noise ratio of each of the plurality of obtained fingerprint images is calculated. In this way, a fingerprint image with the highest signal-to-noise ratio is obtained, that is, a fingerprint image with the most obvious fingerprint information. The gain corresponding to the fingerprint image with the most obvious fingerprint information is recorded as well.

At block S14, the number of times of the corresponding gain is counted. For example, the number of times of the corresponding gain is increased by one.

Therefore, a primary statistics is conducted before the user unlocks the device with his/her fingerprint to facilitate subsequent use. In the subsequent use, the statistics for gains are updated constantly to increase success rate of fingerprint unlocking.

A plurality of gains included in such an embodiment. The gains can be divided into several levels according to humidity of a human's finger, levels of cleanness of a human's finger, environmental temperatures, and levels of wet on a human's finger. Each of the plurality of gains corresponds to a fingerprint image.

Figure 3:
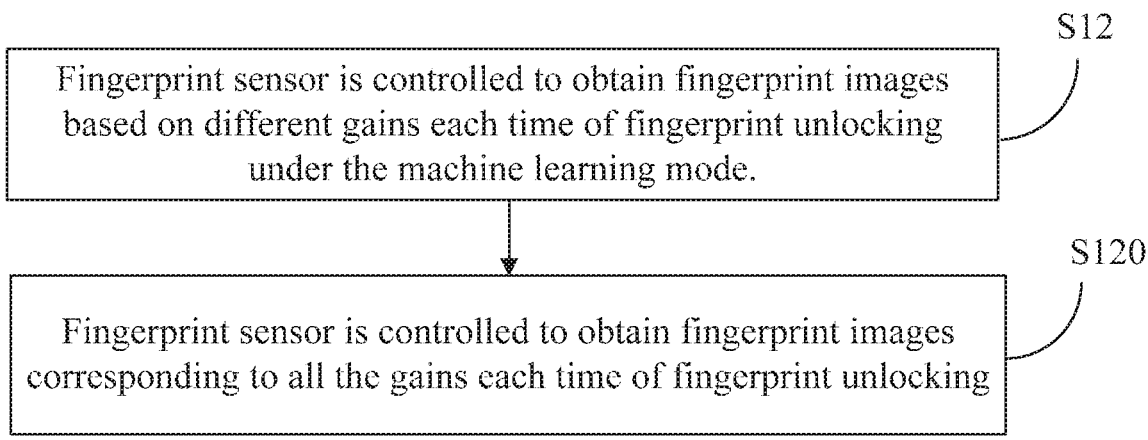
FIG. 3 illustrates a schematic flowchart of a control method according to still another embodiment of the present disclosure.

As FIG. 3 illustrates, block S12 further includes block S120.

At block S120, the fingerprint sensor is controlled to obtain fingerprint images corresponding to all the gains each time of fingerprint unlocking.

It is likely that unlocking in some extreme conditions may be ineffective with the identical gains. As a result, it is impossible to calculate gains with successful unlocking in corresponding conditions. On the contrary, with fingerprint images corresponding to all gains obtained each time the device is unlocked, such failure may be avoided and external qualifications of fingerprint unlocking can be broader, which increases the success rate of fingerprint unlocking.

Figure 4:
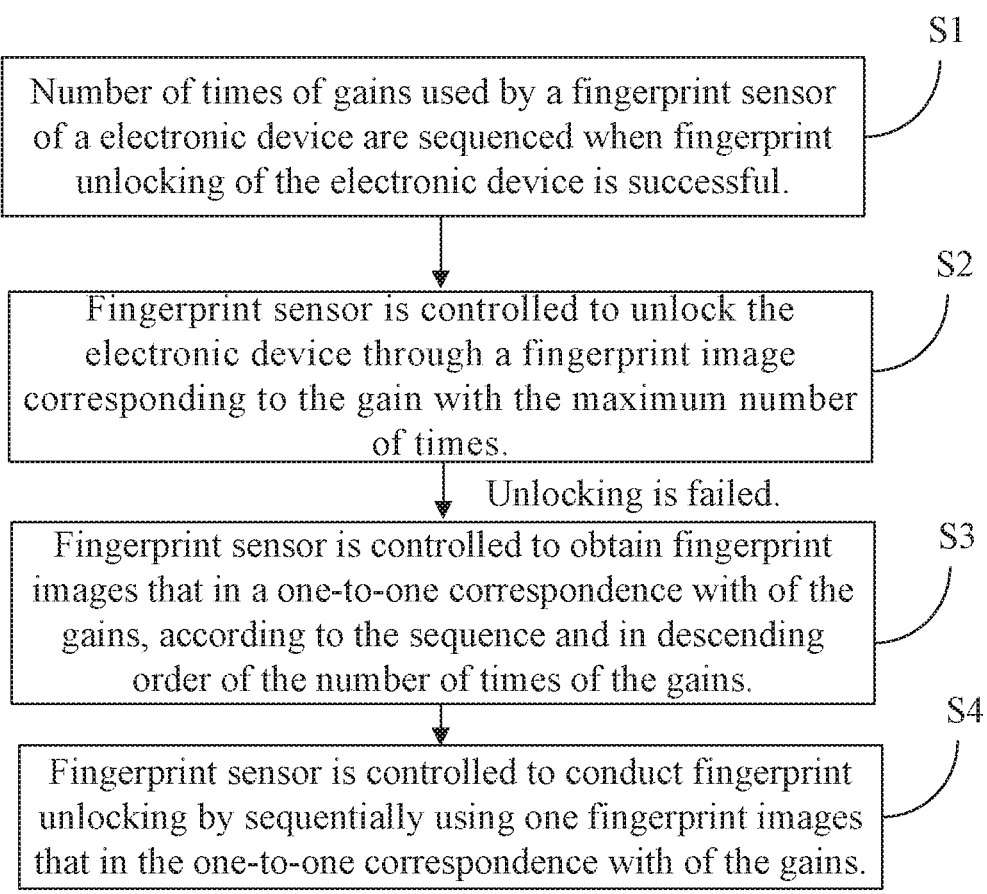
FIG. 4 illustrates a schematic flowchart of a control method according to still another embodiment of the present disclosure.

As FIG. 4 illustrates, the control method further includes block S3 and block S4 in some embodiments.

At block S3, the fingerprint sensor is controlled to obtain fingerprint images that in a one-to-one correspondence with of the gains, according to the sequence and in descending order of the number of times of the gains if fingerprint unlocking fails in block S2.

Unlocking often fails due to variation of scenes although at block S2, the gain with the maximum number of times is adopted to obtain a fingerprint image to unlock the device. For example, a dry finger becomes moist because of a change in weather.

In such a condition, the electronic device controls the fingerprint sensor to obtain fingerprint images which the other gains correspond to sequentially in a descending order according to the order of the gains except for the gain with the maximum number of times.

By controlling the fingerprint sensor to obtain fingerprint images that in a one-to-one correspondence with of the gains according to the sequence and in descending order of the number of times of the gains, the number of times of comparison in subsequent unlocking can be decreased.

At block S4, the fingerprint sensor is controlled to conduct fingerprint unlocking by sequentially using one fingerprint images that in the one-to-one correspondence with of the gains.

Therefore, it is possible to consecutively try fingerprint images corresponding to other gains to unlock the device until success once the fingerprint image corresponding to the gain with the maximum number of times fails to unlock the device.

Figure 5:
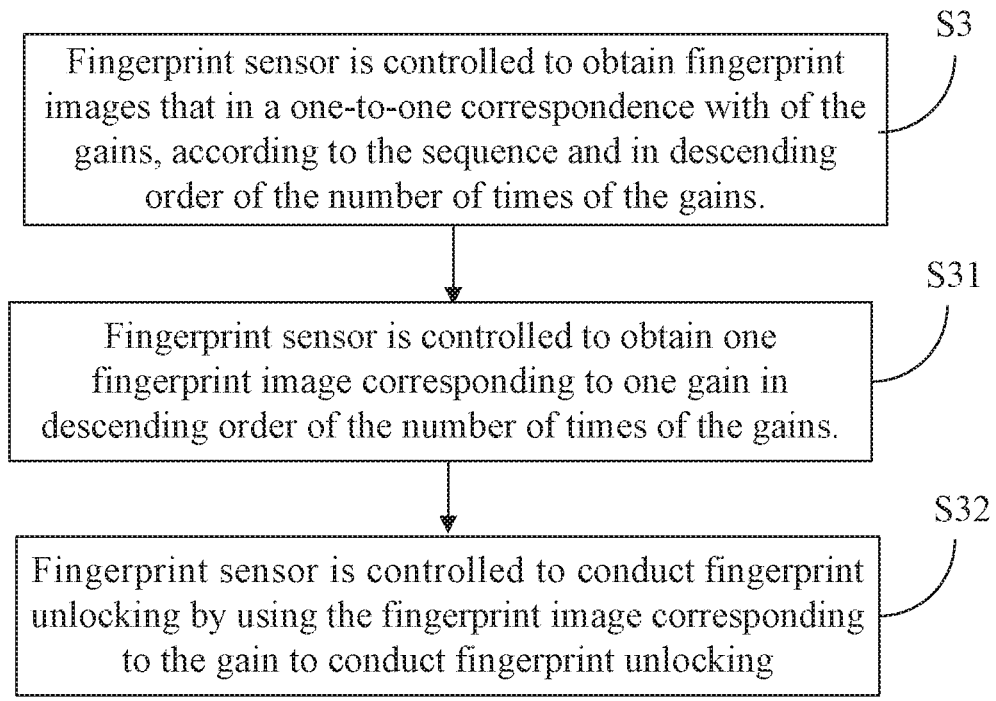
FIG. 5 illustrates a schematic flowchart of a control method according to yet another embodiment of the present disclosure.

As FIG. 5 illustrates, block S3 further includes block S31 and S32 in some embodiments.

At block S31, the fingerprint sensor is controlled to obtain one fingerprint image corresponding to one gain in descending order of the number of times of the gains.

At block S32, the fingerprint sensor is controlled to conduct fingerprint unlocking by using the fingerprint image corresponding to the gain to conduct fingerprint unlocking.

That is, one fingerprint image is obtained each time in descending order of the number of times of the gains. The obtained fingerprint image is used for fingerprint unlocking. The device is unlocked with the obtained fingerprint image. If the unlocking of the device fails, continue to obtain the fingerprint image; otherwise, stop obtaining fingerprint images corresponding to other gains.

Therefore, the number of obtaining fingerprint images can be reduced effectively, thereby shortening unlock time.

Figure 6:
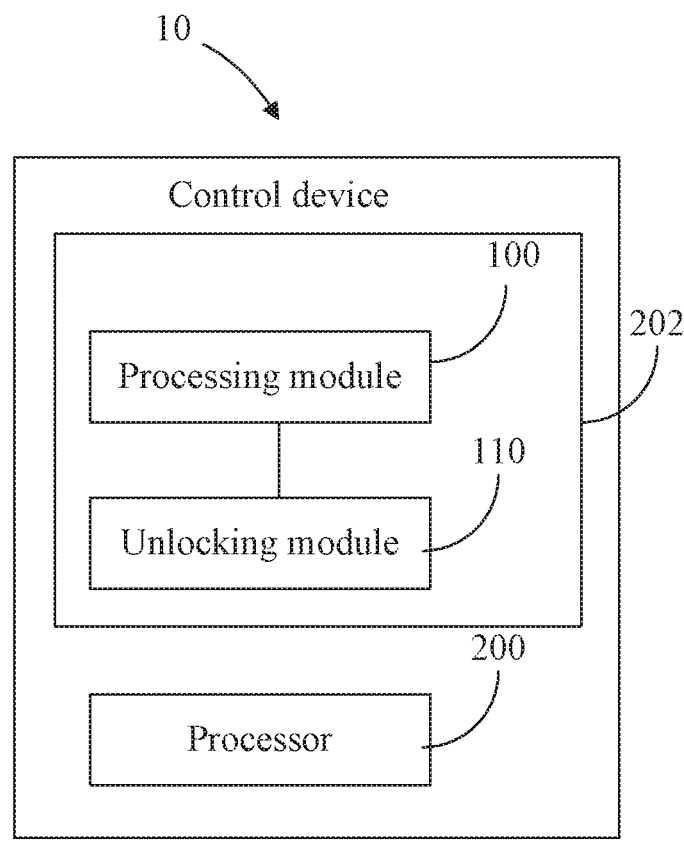
FIG. 6 illustrates a schematic block diagram of a control device according to one embodiment of the present disclosure.

As FIG. 6 illustrates, a control device 10 is configured to control an electronic device 20 in the present embodiment.

The control device 10 includes a processor 200 and a memory 202 storing a plurality of program instructions executable by the processor 200. The program instructions include a processing module 100 and an unlocking module 110.

The electronic device 20 includes a fingerprint sensor 200.

The processing module 100 and the fingerprint sensor 200 are connected. The processing module 100 is configured to sequence the number of times of gains used by the fingerprint sensor 200 of the electronic device 20 when fingerprint unlocking of the electronic device 20 is successful.

The unlocking module 110 and the processing module 100 are connected. The unlocking module 110 is configured to control the fingerprint sensor 200 to directly use a gain with the maximum number of times to obtain a fingerprint image to conduct fingerprint unlocking. The unlocking module 110 is further configured to control the fingerprint sensor 200 to obtain a fingerprint image based on a gain used for the last successful fingerprint unlocking to conduct fingerprint unlocking.

The processing module 100 is further configured to update the sequence of the number of times of the gains, after the fingerprint unlocking is successful 1.

The control device 10 adopts a fingerprint image corresponding to a gain with the maximum number of times to quickly unlock the device. It is not only user-friendly but also makes fingerprint unlocking personalized.

The description of the control method is the same as the description of the control device 10 introduced in the above-mentioned embodiment. The present disclosure will not go further on this topic.

Figure 7:
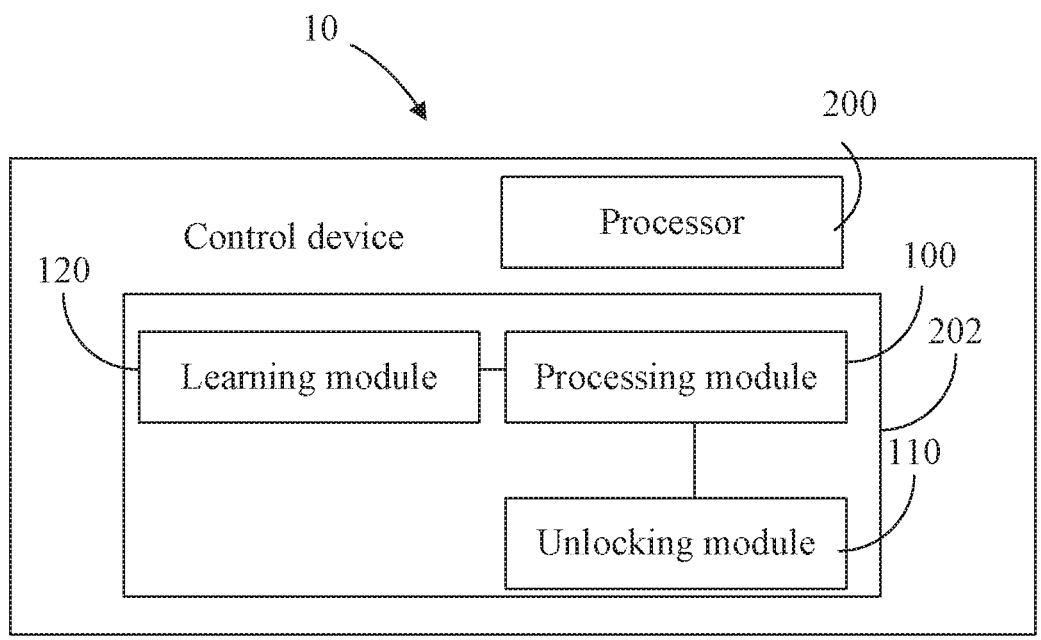
FIG. 7 illustrates a schematic block diagram of a control device according to another embodiment of the present disclosure.

As FIG. 7 illustrates, the control device 10 further includes a learning module 120 in some embodiments.

The learning module 120 and the processing module 100 are connected. The learning module 120 is configured to control the control device 10 to enable the machine learning mode.

The processing module 100 is further configured to control the fingerprint sensor 200 to obtain a plurality of fingerprint images based on different gains each time of fingerprint unlocking under the machine learning mode.

The processing module 100 is further configured to process the plurality of fingerprint images to obtain a fingerprint image with the highest signal-to-noise ratio and a corresponding gain.

The processing module 100 is further configured to count the number of times of the corresponding gain. For example. The processing module 100 is configured to increase the number of times of the corresponding gain by one.

Therefore, a primary statistics is conducted before the user unlocks the device with his/her fingerprint to facilitate subsequent use. In the subsequent use, the statistics for gains are updated constantly to increase success rate of fingerprint unlocking.

In some embodiments, the gains include a plurality of gains and each gain corresponds to one fingerprint image. The processing module 100 is further configured to control the fingerprint sensor 200 to obtain fingerprint images corresponding to all the gains each time of fingerprint unlocking.

Conditions may be effectively avoided, for example, unlocking in some extreme conditions failing with the same gain or the same gains or the statistics for gains for successful unlocking in corresponding conditions failing. Therefore, external qualifications of fingerprint unlocking are broader, which increases the success rate of fingerprint unlocking.

In some embodiments, the processing module 100 is further configured to control the fingerprint sensor 200 to obtain fingerprint images that in a one-to-one correspondence with of the gains, according to the sequence and in descending order of the number of times of the gains, when fingerprint unlocking conducted through the fingerprint image corresponding to the gain with the maximum number of times fails.

The unlocking module 110 is configured to control the fingerprint sensor 200 to conduct fingerprint unlocking by sequentially using one fingerprint images that in the one-to-one correspondence with of the gains.

Therefore, it is possible to consecutively try fingerprint images corresponding to the other gains to unlock the device until success when fingerprint unlocking conducted through the fingerprint image corresponding to the gain with the maximum number of times fails.

The processing module 100 is configured to control the fingerprint sensor 200 to obtain one fingerprint image corresponding to one gain in descending order of the number of times of the gains.

The unlocking module 110 is configured to control the fingerprint sensor 200 to conduct fingerprint unlocking by using the fingerprint image corresponding to the gain to conduct fingerprint unlocking.

Therefore, it is effective to reduce the frequency and the success of fingerprint images. In other words, time of unlocking the device shortens.

It is notified that the description of the control method introduced in the aforementioned embodiment is the same as the description of the control device 10 introduced in the present embodiment. The present disclosure will not go further on this topic.

Figure 8:
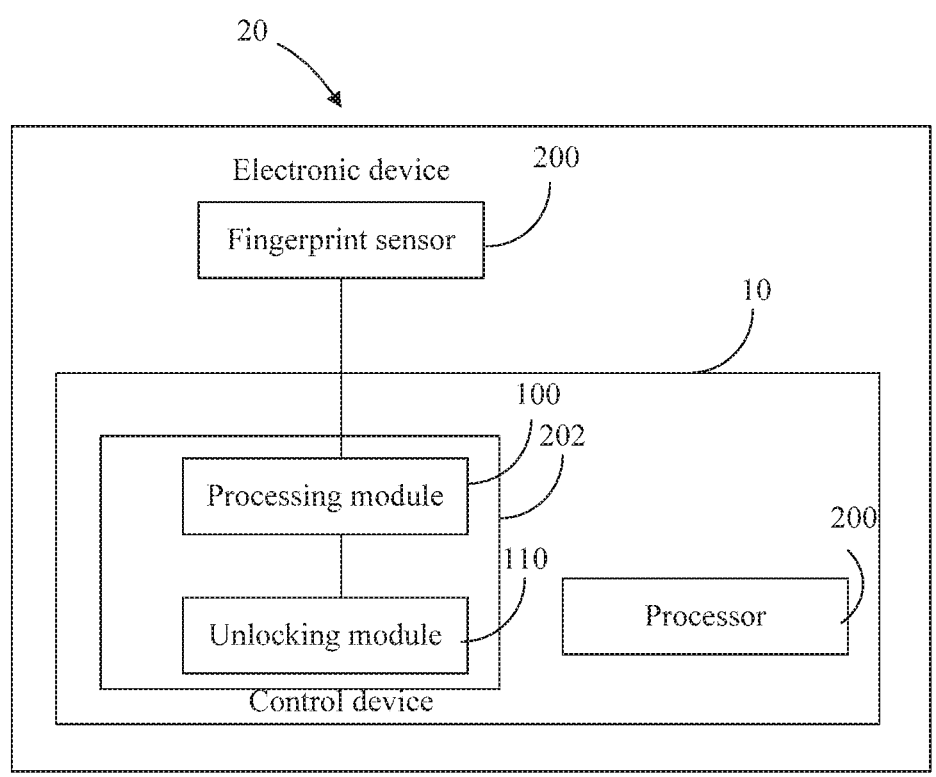
FIG. 8 illustrates a schematic block diagram of an electronic device according to one embodiment of the present disclosure.

As FIG. 8 illustrates, the electronic device 20 includes the control device 10 introduced by the above-mentioned embodiment.

The electronic device 20 including the control device 10 may adopt a fingerprint image corresponding to the gain with the maximum number of times to unlock the device quickly. It is not only user-friendly but also makes fingerprint unlocking personalized.

In other embodiments, the electronic device 20 may be a cell phone or a tablet computer.

The electronic device 20 may be used in, but is not limited to, the present embodiment.

The electronic device 20 with the above-mentioned control method and control device 10 may be applied. Any detail which is not disclosed here may be refer to the same or similar introductions to the above-mentioned control method and control device 10. The present disclosure will not go further on this topic.

It is understood that terminologies, such as "center," "longitudinal," "horizontal," "length," "width," "thickness," "upper," "lower," "before," "after," "left," "right," "vertical," "horizontal," "top," "bottom," "inner," "outer," "clockwise," and "counterclockwise," are locations and positions regarding the figures. These terms merely facilitate and simplify descriptions of the embodiments instead of indicating or implying the device or components to be arranged on specified locations, to have specific positional structures and operations. These terms shall not be construed in an ideal or excessively formal meaning unless it is clearly defined in the present specification.

In addition, the term "first", "second" are for illustrative purposes only and are not to be construed as indicating or imposing a relative importance or implicitly indicating the number of technical features indicated. Thus, a feature that limited by "first", "second" may expressly or implicitly include at least one of the features. In the description of the present disclosure, the meaning of "plural" is two or more, unless otherwise specifically defined.

All of the terminologies containing one or more technical or scientific terminologies have the same meanings that persons skilled in the art understand ordinarily unless they are not defined otherwise. For example, "arrange," "couple," and "connect," should be understood generally in the embodiments of the present disclosure. For example, "firmly connect," "detachably connect," and "integrally connect" are all possible. It is also possible that "mechanically connect," "electrically connect," and "mutually communicate" are used. It is also possible that "directly couple," "indirectly couple via a medium," and "two components mutually interact" are used.

All of the terminologies containing one or more technical or scientific terminologies have the same meanings that persons skilled in the art understand ordinarily unless they are not defined otherwise. For example, "upper" or "lower" of a first characteristic and a second characteristic may include a direct touch between the first and second characteristics. The first and second characteristics are not directly touched; instead, the first and second characteristics are touched via other characteristics between the first and second characteristics. Besides, the first characteristic arranged on/above/over the second characteristic implies that the first characteristic arranged right above/obliquely above or merely means that the level of the first characteristic is higher than the level of the second characteristic. The first characteristic arranged under/below/beneath the second characteristic implies that the first characteristic arranged right under/obliquely under or merely means that the level of the first characteristic is lower than the level of the second characteristic.

Different methods or examples are introduced to elaborate different structures in the embodiments of the present disclosure. To simplify the method, only specific components and devices are elaborated by the present disclosure. These embodiments are truly exemplary instead of limiting the present disclosure. Identical numbers and/or letters for reference are used repeatedly in different examples for simplification and clearance. It does not imply that the relations between the methods and/or arrangement. The methods proposed by the present disclosure provide a variety of examples with a variety of processes and materials. However, persons skilled in the art understand ordinarily that the application of other processes and/or the use of other kinds of materials are possible.

In the description of this specification, the description of the terms "one embodiment", "some embodiments", "examples", "specific examples", or "some examples", and the like, means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples. In addition, it will be apparent to those skilled in the art that different embodiments or examples described in this specification, as well as features of different embodiments or examples, may be combined without contradictory circumstances.

Any process or method described in the flowchart or otherwise described herein may be understood to include one or more modules, fragments, or portions of code of an executable instruction to implement a particular logical function or process. In addition, the scope of at least one embodiment of the present disclosure includes additional implementations in which the functions may be performed in a sequence that is not shown or discussed, including in a substantially simultaneous manner or in the reverse order depending on the function involved, which is understood by those skilled in the art to which this present disclosure pertains.

The logic and/or blocks described in the flowchart or otherwise described herein, for example, a sequence list of an executable instruction for implementing a logic function, may be implemented in any computer-readable medium for use by an instruction execution system, device or equipment (such as a computer-based system, a system including a processor, or other system that can access instructions from an instruction execution system, device or equipment and execute instructions), or may be used in conjunction with the instruction execution system, device or equipment. As used herein, "computer-readable medium" may be any device that may include a store, communication, broadcast, or transmission program for use by an instruction execution system, device or equipment, or in conjunction with such instruction execution systems, device, or equipment. A more specific example (non-exhaustive list) of the computer-readable medium includes the following: an electrical connection portion (an electronic device) with one or more routing, a portable computer disk cartridge (a magnetic device), a random access memory (RAM), a read only memory (ROM), an erasable programmable read only memory (EPROM or a flash memory), a fiber optic device, and a portable compact disc read only memory (CDROM). In addition, the computer-readable medium may even be a paper or other suitable medium on which the program may be printed. For example, through performing an optical scan on the paper or other media, followed by editing, interpretation, or, if necessary, other suitable methods to process, the program is obtained in an electronic manner, and then the program is stored in a computer memory.

It should be understood that the various parts of the present disclosure may be implemented by using hardware, software, firmware, or combinations thereof. In the above embodiment, the plurality of blocks or methods may be implemented by using software or firmware stored in the memory and executed by a suitable instruction execution system. For example, if the present disclosure is implemented by hardware, as in another embodiment, it may be implemented by any of the following techniques known in the art or a combination thereof: a discrete logic circuit of logic gates having a logic function for a data signal, an application specific integrated circuit with suitable combinational logic gates, a programmable gate array (PGA), a field programmable gate array (FPGA), and the like.

It will be understood by those of ordinary skill in the art that all or part of the blocks for implementing the method of the embodiments described above may be accomplished by a program that commands the relevant hardware. The program may be stored in a computer readable storage medium. When the program is executed, one of the blocks of the method embodiment or a combination thereof may be included.

In addition, the functional units in the various embodiments of the present disclosure may be integrated into a processing module, or each unit may be physically present individually, or two or more units may be integrated into one module. The above integrated module may be implemented by using hardware, or may be implemented by using a software function module. The integrated module may be stored in a computer readable storage medium if it is implemented by a software function module and is sold or used as a standalone product.

The above-mentioned storage medium may be a read-only memory, a magnetic disk, or an optical disk.

While the embodiments of the present disclosure have been shown and described above, it is to be understood that the above embodiments are exemplary and are not to be construed as limiting the present disclosure. One of ordinary skill in the art may make variations, modifications, substitutions and alterations to the above embodiments within the scope of the present disclosure.

What is claimed is:

1. A controlling method of controlling an electronic device, comprising:
   sequencing the number of times of gains used by a fingerprint sensor of the electronic device when fingerprint unlocking of the electronic device is successful; and
   controlling the fingerprint sensor to directly use a gain with the maximum number of times to obtain a fingerprint image to conduct fingerprint unlocking;
   wherein the process of sequencing comprises:
   enabling a machine learning mode;
   controlling, under the machine learning mode, the fingerprint sensor to obtain a plurality of fingerprint images based on different gains each time of fingerprint unlocking;
   processing the plurality of fingerprint images to obtain a fingerprint image with the highest signal-to-noise ratio and a corresponding gain; and
   increasing the number of times of the corresponding gain by one.

2. The control method of claim 1, wherein the gains comprise a plurality of gains and each gain corresponds to one fingerprint image; and
   the process that obtain the plurality of fingerprint images based on different gains comprises:
   controlling the fingerprint sensor to obtain fingerprint images corresponding to all the gains each time of fingerprint unlocking.

3. The control method of claim 1, wherein the process of fingerprint unlocking comprises:
   when fingerprint unlocking conducted through the fingerprint image corresponding to the gain with the maximum number of times fails, controlling the fingerprint sensor to obtain fingerprint images that in a one-to-one correspondence with of the gains, according to the sequence and in descending order of the number of times of the gains; and
   controlling the fingerprint sensor to conduct fingerprint unlocking by sequentially using one fingerprint images that in the one-to-one correspondence with of the gains.

4. The control method of claim 3, wherein controlling the fingerprint sensor to obtain the fingerprint images that in the one-to-one correspondence with of the gains, according to the sequence and in descending order of the number of times of the gains comprise:
   controlling the fingerprint sensor to obtain one fingerprint image corresponding to one gain in descending order of the number of times of the gains; and controlling the fingerprint sensor to conduct fingerprint unlocking by using said one fingerprint image corresponding to said one gain to conduct fingerprint unlocking.

5. The control method of claim 1, further comprising:
controlling the fingerprint sensor to obtain a fingerprint image based on a gain used for the last successful fingerprint unlocking to conduct fingerprint unlocking.

6. The control method of claim 1, further comprising:
updating the sequence of the number of times of the gains, after the fingerprint unlocking is successful.

7. The control method of claim 1, wherein the gains comprises a plurality of gains and each gain corresponds to one finger humidity.

8. The control method of claim 1, wherein the gains comprises a plurality of gains and each gain corresponds to one environmental temperature degree.

9. A control device, configured to control an electronic device, comprising:
a processor; and
a memory connected with the processor, the memory comprising a plurality of program instructions executable by the processor, the plurality of program instructions comprising:
a processing module, connected to a fingerprint sensor of the electronic device and configured to cause the processor to sequence the number of times of gains used by a fingerprint sensor of the electronic device when fingerprint unlocking of the electronic device is successful;
an unlocking module, connected to the processing module and configured to cause the processor to control the fingerprint sensor to directly use a gain with the maximum number of times to obtain a fingerprint image to conduct fingerprint unlocking-; and
a learning module, connected to the processing module and configured to cause the processor to control the control device to enable a machine learning mode; and
the processing module, further configured to cause the processor to control the fingerprint sensor to obtain a plurality of fingerprint images based on different gains each time of fingerprint unlocking under the machine learning mode;
the processing module, further configured to cause the processor to process the plurality of fingerprint images to obtain a fingerprint image with the highest signal-to-noise ratio and a corresponding gain; and
the processing module, further configured to cause the processor to count the number of times of the corresponding gain.

10. The control device of claim 9, wherein the gains comprise a plurality of gains and each gain corresponds to one fingerprint image; and the processing module is further configured to cause the processor to control the fingerprint sensor to obtain fingerprint images corresponding to all the gains each time of fingerprint unlocking.

11. The control device of claim 9, wherein the processing module is further configured to cause the processor to control the fingerprint sensor to obtain fingerprint images that in a one-to-one correspondence with of the gains, according to the sequence and in descending order of the number of times of the gains, when fingerprint unlocking conducted through the fingerprint image corresponding to the gain with the maximum number of times fails; and the unlocking module is configured to cause the processor to control the fingerprint sensor to conduct fingerprint unlocking by sequentially using one fingerprint images that in the one-to-one correspondence with of the gains.

12. The control device of claim 11, wherein the processing module is configured to cause the processor to control the fingerprint sensor to obtain one fingerprint image corresponding to one gain in descending order of the number of times of the gains; and the unlocking module is configured to cause the processor to control the fingerprint sensor to conduct fingerprint unlocking by using said one fingerprint image corresponding to said one gain to conduct fingerprint unlocking.

13. The control device of claim 9, wherein the unlocking module is further configured to cause the processor to control the fingerprint sensor to obtain a fingerprint image based on a gain used for the last successful fingerprint unlocking to conduct fingerprint unlocking.

14. The control device of claim 9, wherein the processing module is further configured to cause the processor to update the sequence of the number of times of the gains, after the fingerprint unlocking is successful.

15. The control device of claim 9, wherein the gains comprises a plurality of gains and each gain corresponds to one finger humidity.

16. The control device of claim 9, wherein the gains comprises a plurality of gains and each gain corresponds to one environmental temperature degree.

17. An electronic device comprising:
a processor; and
a memory connected with the processor, the memory comprising a plurality of program instructions executable by the processor, the plurality of program instructions comprising:
a processing module, connected to a fingerprint sensor of the electronic device and configured to cause the processor to sequence counts of gains adopted by the fingerprint sensor when the electronic device is unlocked successfully with a fingerprint;
an unlocking module, connected to the processing module and configured to cause the processor to control the fingerprint sensor to unlock the electronic device through a fingerprint image corresponding to a gain with the most counts; and
a learning module, connected to the processing module and configured to cause the processor to control the electronic device to enable a machine learning mode; and
the processing module, further configured to cause the processor to control the fingerprint sensor to obtain a plurality of fingerprint images based on different gains each time of fingerprint unlocking under the machine learning mode;
the processing module, further configured to cause the processor to process the plurality of fingerprint images to obtain a fingerprint image with the highest signal-to-noise ratio and a corresponding gain; and
the processing module, further configured to cause the processor to count the counts of the corresponding gain.

18. The electronic device as claimed in claim 17 being a cell phone or a tablet computer.

* * * * *